Sept. 8, 1970 L. C. CHOUINGS ET AL 3,527,504
ANTI-LOCK MEANS FOR FLUID PRESSURE-OPERATED BRAKING SYSTEMS
Original Filed Feb. 9, 1968 5 Sheets-Sheet 4
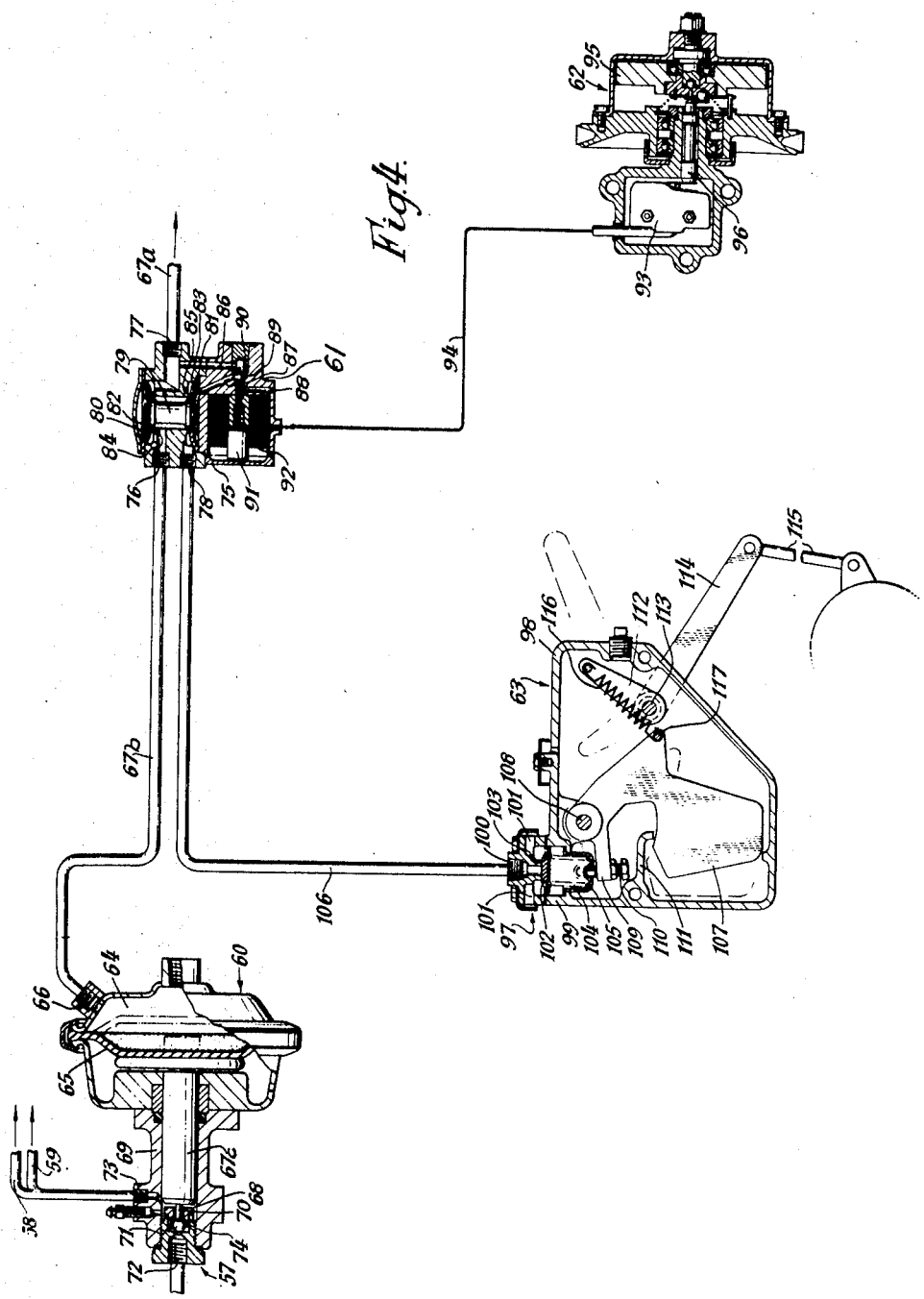

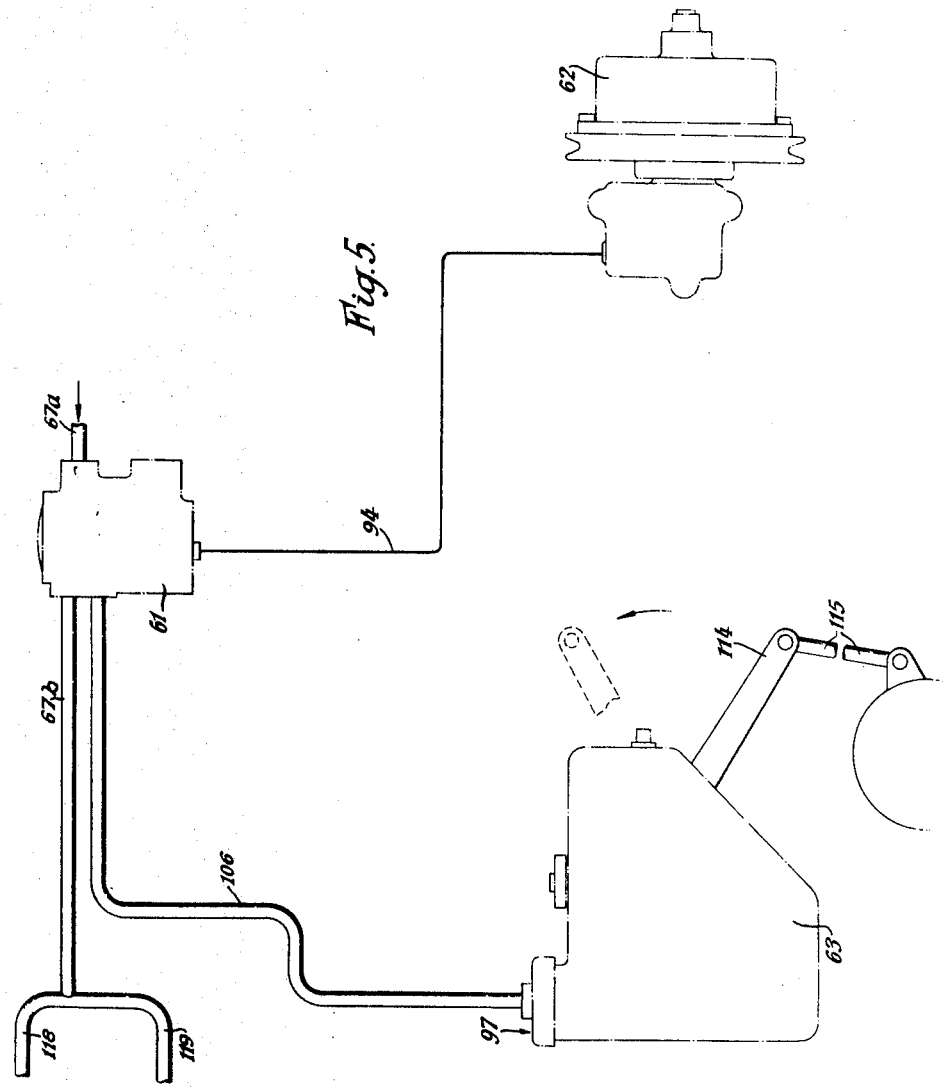

United States Patent Office 3,527,504
Patented Sept. 8, 1970

3,527,504
ANTI-LOCK MEANS FOR FLUID PRESSURE-OPERATED BRAKING SYSTEMS
Leslie C. Chouings, Mervyn B. Packer, and David Parsons, Leamington Spa, England, assignors to Automotive Products Company Limited, Leamington Spa, England
Continuation of application Ser. No. 704,310, Feb. 9, 1968. This application May 9, 1969, Ser. No. 835,856
Claims priority, application Great Britain, Feb. 10, 1967, 6,442/67; July 13, 1967, 32,343/67
Int. Cl. B60t 8/12, 8/18
U.S. Cl. 303—21  12 Claims

ABSTRACT OF THE DISCLOSURE

An anti-lock system for incorporation in a fluid pressure-operated braking system of a vehicle wherein a relief valve is disposed in the exhaust line of the anti-lock system, the exhaust pressure acting on the valve to open the same being opposed by a force created by the combined action of means actuated by vehicle deceleration and means actuated by vehicle loading.

---

Figure 1:
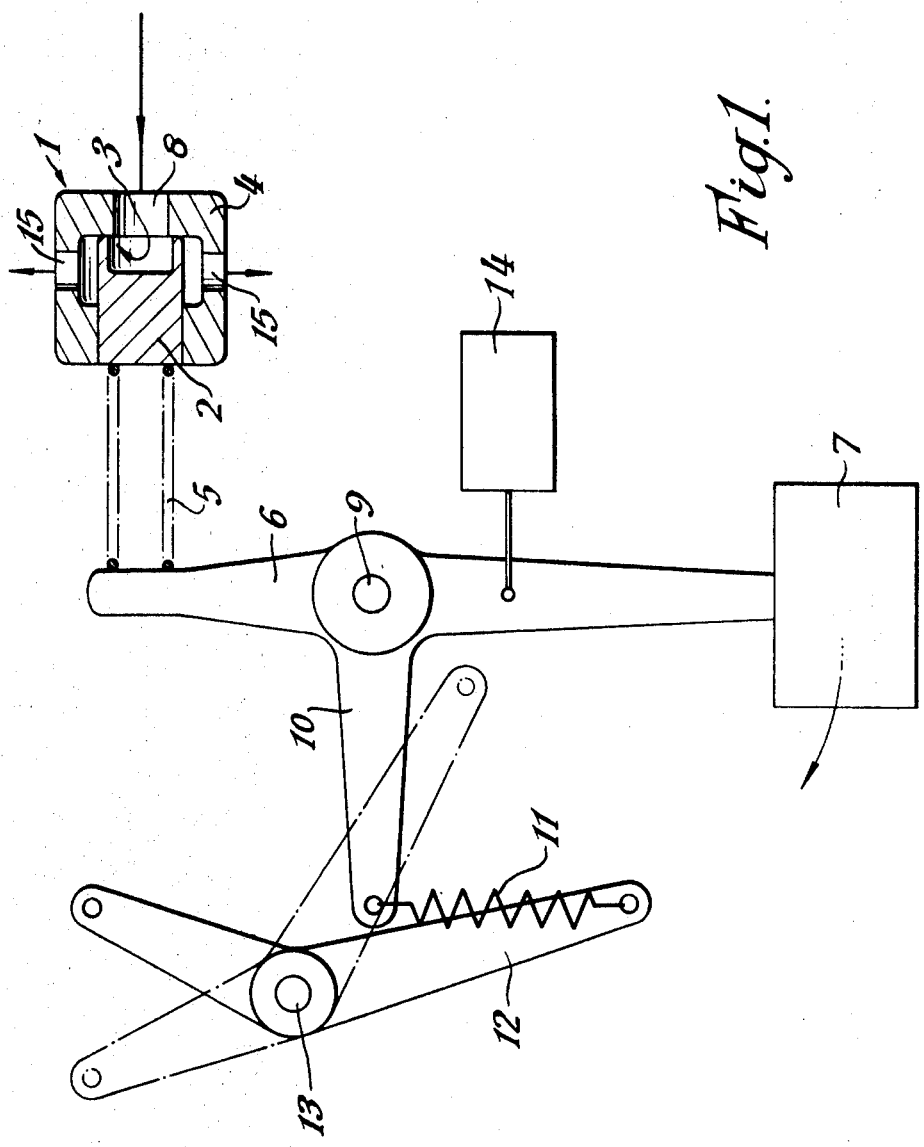

This is a continuation of Ser. No. 704,310, filed Feb. 9, 1968, now abandoned.

This invention relates to means, referred to as anti-lock means, for incorporation in a fluid pressure-operated braking system of a vehicle, said means being operable to reduce automatically the fluid pressure exerted to apply the brake or brakes acting to resist rotation of a wheel or wheels of the vehicle as a result of a tendency of the said wheel or wheels to skid or to approach conditions in which skidding would commence, so that the braking can be relieved to prevent wheel locking and resultant sliding of the vehicle. The invention also relates to fluid pressure-operated braking systems incorporating such means.

It has already been proposed to use in anti-lock systems a reference unit generally referred to as of the "inertia type." However it is generally accepted that an anti-lock system incorporating an inertia type reference unit having fixed control characteristics has a limited range of practical operation in relation to variations in road surface conditions and variations in vehicle loading. Whilst a system of this kind can be regulated so that the same will give satisfactory operation on a road surface having a low $\mu$ characteristic with the vehicle in an unladen condition, the deceleration of the same vehicle when fully laden and travelling on a better road surface providing a higher $\mu$ characteristic may be reduced. The principal reason for this reduction is the tendency of the brake pressure to undershoot whilst the wheel or wheels are accelerating following an anti-lock operation with the result that the brakes are taken off too much.

In accordance with the present invention however the efficiency of operation of an anti-lock system of the kind above referred to is improved by providing means for controlling the exhaust of pressure fluid from the anti-lock system, means also being provided for regulating said exhaust control means to compensate for variations in the frictional grip or $\mu$ of road surface to vehicle wheel and vehicle load. According to the invention the means for controlling the exhaust of pressure fluid from the anti-lock system comprises a relief valve disposed in the exhaust line of the anti-lock system, the actuation of the valve to permit the exhaust of the pressure fluid from the anti-lock system being regulated by means actuated by vehicle deceleration in combination with means actuated by the loading of the vehicle.

The relief valve can be a simple spring loaded valve the spring loading being varied in accordance with the deceleration of the vehicle and also vehicle loading. Alternatively the relief valve can be a non-reactive trap valve.

Anti-lock means according to the invention comprises for example a control valve for connection between a source of compressed air and brake actuating means operable directly by said compressed air or means operable by said compressed air and associated with brake actuating means, a sensing device of the inertia type for sensing vehicle wheel speed operatively associated with the control valve so as to cause or permit actuation of said control valve to interrupt the flow of compressed air from the source of supply to the means operated thereby and divert the compressed air to exhaust upon any tendency for a wheel or wheels to lock to relieve the brake pressure and a valve for controlling the exhaust of the compressed air in accordance with vehicle deceleration and vehicle load.

The control valve has for example a movable valve member which is urged to a first position to close the exhaust outlet of the valve by the compressed air acting on a piston or diaphragm associated with the said movable valve member, the release of the compressed air from one side of the diaphragm permitting the movable valve member to move to a second position to interrupt the flow of compressed air from the source of supply and open the exhaust, the release of the compressed air resulting from unseating of a closure member in the control valve said closure member being associated with a solenoid the circuit of which is controlled by an electrical switch associated with so as to be operable by the inertia type sensing device.

The valve controlling the exhaust of the compressed air has a closure member which is urged to a closed position by spring loading which acts against the pressure of the compressed air tending to unseat the closure member. The spring loading on the closure member is varied automatically in accordance with vehicle deceleration and vehicle loading such variation being obtained by the combined action by means for detecting vehicle loading and further means operable by deceleration of the vehicle and comprising an inertia device for example a pendulum.

The anti-lock means of the present invention can be incorporated in a pneumatically operated braking system or in a hydraulically operated braking system. In a pneumatically operated braking system the control valve is connected between the source of supply of compressed air and the wheel cylinders of the brakes. In a hydraulically operated braking system the control valve is connected between the source of supply of compressed air and a servo-motor operated by said compressed air, the servo-motor controlling operation of a valve in the hydraulic brake circuit, the arrangement being such that under normal conditions compressed air supplied to the servo-motor maintains the valve open to permit the supply of hydraulic liquid to the wheel cylinders of the brakes, interruption of the supply of compressed air permitting the servo-motor to operate to permit the hydraulic control valve to move towards the closed position, such closure being regulated by the exhaust valve of the anti-lock system.

Embodiments of the invention will now be described with the aid of the accompanying drawings in which:

FIG. 1 shows diagrammatically the means according to one embodiment of the invention.

Figure 2:
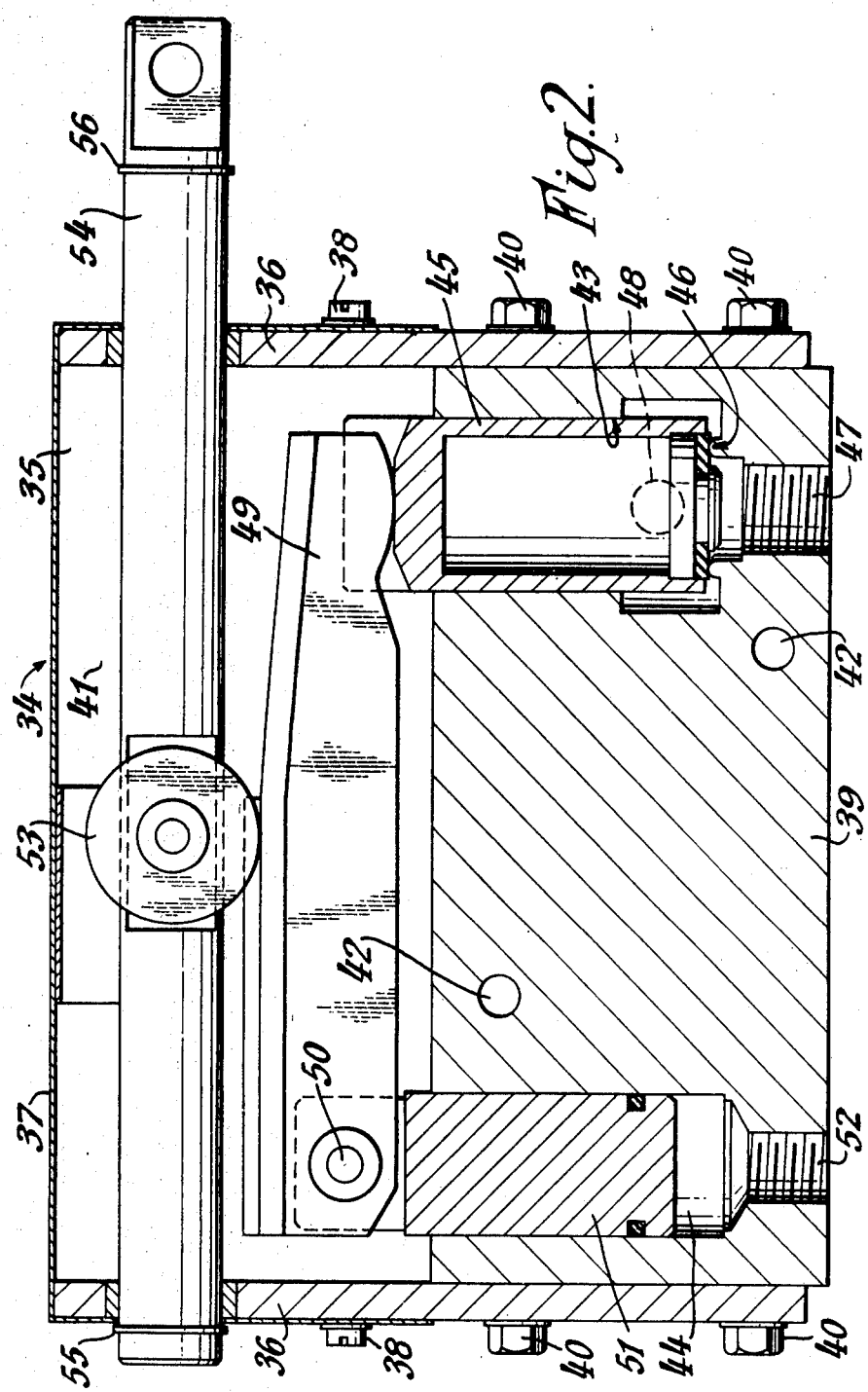
Figure 3:
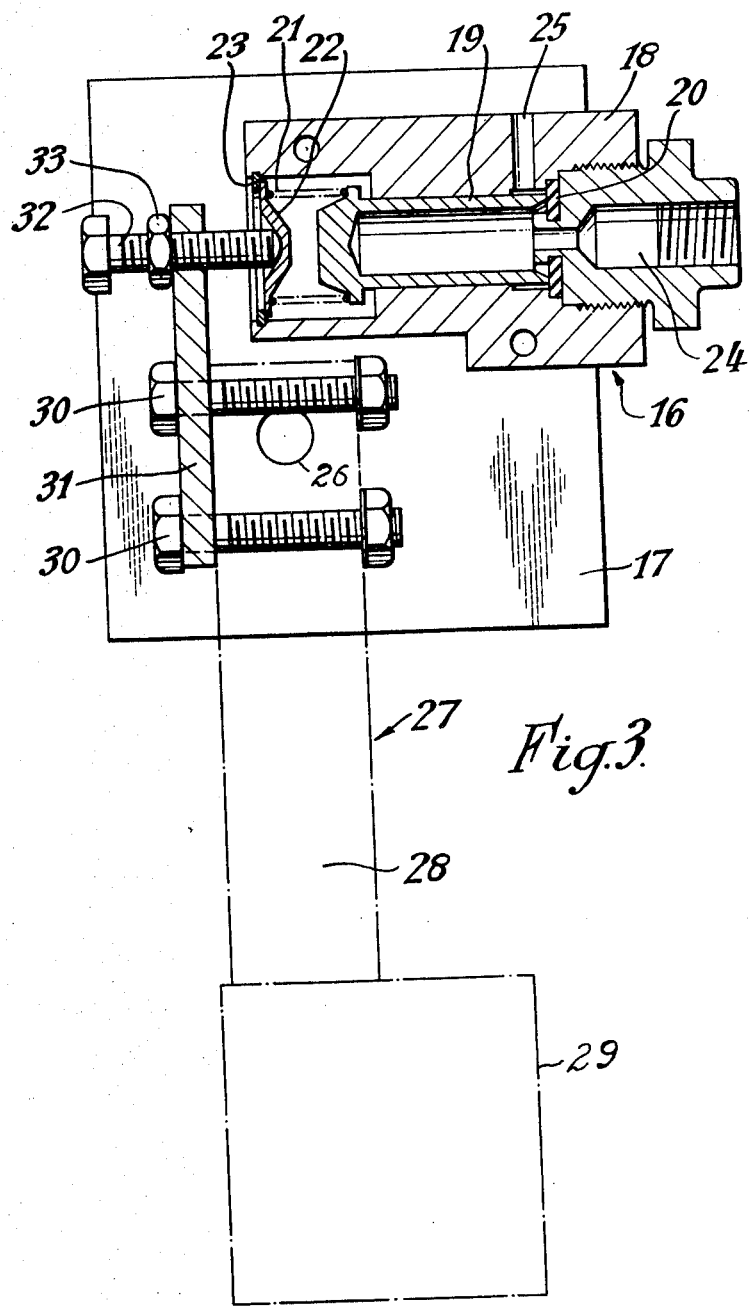

FIG. 2 shows in longitudinal section the means sensitive to vehicle loading and the relief valve according to a further embodiment of the invention, FIG. 3 shows in section the means sensitive to vehicle deceleration for use in combination with the means of FIG. 2, FIG. 4 shows an anti-lock system according to one embodiment of the invention for incorporation in a hydraulic braking system for a vehicle, and FIG. 5 shows the anti-lock system of FIG. 4 modified for incorporation in a pneumatic braking system for a vehicle.

Referring to FIG. 1 of the accompanying drawings the relief valve is a simple spring loaded valve indicated generally by reference numeral 1 the movable valve member 2 being urged onto its seating 3 in the valve body 4 by a spring 5. The reaction of the relief valve spring 5 is taken by a pendulum arm 6 having a mass 7 the pendulum arm being mountable so as to be swingable in the fore and aft direction of the vehicle so that the relief pressure is variable according to the movement of the pendulum resulting from vehicle deceleration. The pendulum is capable of applying the maximum spring force required but is resisted by a separate spring the action of which is controlled in accordance with the loading of the vehicle, so that the resultant force from the pendulum acting on the relief valve is a combination of vehicle deceleration and vehicle loading. Since the variation in pressure involves ratio change and not a simple addition or subtraction, the effective rate of the spring actuated by vehicle loading is variable. This is effected by moving the earth reaction point of this spring so that its moment arm and therefore rate is reduced.

In this embodiment of the invention, the relief valve inlet 8 in the valve body 4 is connectable to the exhaust outlet from the anti-lock system of a vehicle. The valve body 4 also has outlets 15 for the exhaust of air from the anti-lock system when the movable member 2 is unseated. One end of the valve spring 5 bears against the upper end of the pendulum arm 6 which is pivotally mounted at a point 9 in its length, on a vehicle so as to be swingable in the fore and aft direction of the vehicle. The pendulum arm has a lever 10 which extends at right angles to the arm length in the forward direction of the vehicle the axis of the lever being co-incident with the pivotal axis 9 of the arm. The outer end of the lever 10 is coupled to one end of a coil spring 11 which extends vertically, the opposite or lower end of the spring being connected to the lower end of a further arm 12 which is pivotally mounted intermediate its length on a pivotal mounting 13 so as also to be rotatable in the fore and aft direction of the vehicle, angular rotation of this arm being dependent upon vehicle loading. Thus the pivotal mounting of this further arm 12 can be arranged on the vehicle chassis, the upper end of the arm being operatively associated with a wheel axle whereby displacement of the vehicle platform relative to the axle results in angular displacement of this further arm 12 in one direction or the other to increase or decrease the tension of the coil spring 11 and consequently the action thereof on the pendulum arm 6. Advantageously a dashpot or other damping device 14 is provided to limit the free swinging movement of the pendulum arm 6.

The means according to the above embodiment can be used in a hydraulically operated braking system incorporating an anti-lock system for example an anti-lock system of the kind disclosed in the specification of British Pat. No. 975,252. The means according to this embodiment of the invention can also be used in a pneumatically operated braking system incorporating an anti-lock system.

The embodiment of the invention shown in FIGS. 2 and 3 of the accompanying drawings is for use in a pneumatically operated braking system for a vehicle. In this embodiment, which also uses a pendulum as the means sensitive to vehicle deceleration, the pendulum force is converted into an air pressure which is reacted on the relief valve through a beam pivotally mounted in its length, the pivotal point or fulcrum of the beam being variable in accordance with vehicle loading.

As shown in FIG. 2 of the drawings the relief valve is combined in a unit with the beam which constitutes the means sensitive to vehicle loading, the pendulum or means sensitive to vehicle deceleration being formed as a separate unit. It will be appreciated however, that the two separate units can be combined with one another to provide a single unit.

Referring to FIG. 3 a valve indicated generally by reference numeral 16, is carried by a bracket 17 adapted to be secured to the vehicle chassis. The valve consists of a valve body 18 having a bore in which the movable valve member 19 is slidable. One end of the movable valve member co-operates with a seating 20 at one end of the valve body bore, the said member being urged onto the seating by a spring 21, one end of which bears against one end of the movable valve member the other end bearing against a spring cup 22 which is held in a limit position by a spring retaining ring 23. When seated the movable valve member 19 closes an inlet port 24 at one end of the valve body bore the port being connectable to the pneumatic braking circuit of the vehicle.

The valve body 18 also has an outlet 25 for the outlet of the pressure air passing through the seating when the movable valve member 19 is unseated this outlet being connectable to a port in the other unit for a purpose later described. The bracket 17 also carries a pivotal mounting 26 for the pendulum 27 which consists of an arm 28 which is mounted about one end on the pivotal mounting 26 the opposite end of the arm carrying the mass 29. The bracket 17 is mounted on the vehicle with the pendulum pivotal axis extending transversely of the vehicle so that the pendulum is swingable in the fore and aft direction of the vehicle, the movable valve member 19 being slidable in the fore and aft direction of the vehicle. Secured by bolts 30 to the pendulum arm 28 is a plate 31 which extends upwardly beyond the pivoted end of the pendulum arm. Adjacent its upper end the plate 31 carries a tappet screw 32 one end of which bears against the spring cup 22. The tappet screw is adjustable and secured in the adjusted position by a lock nut 33. The loading of the spring 21 is therefore variable by displacement of the pendulum 27.

The unit shown in FIG. 2 of the drawings consists of a housing indicated generally by reference numeral 34. The housing comprises a rectangular casing consisting of side walls 35 and end walls 36, the upper end being closed by a removable cover 37 secured by screws 38. The lower end of the casing is closed by a block 39 which is secured by bolts 40, the block extending partially into the casing to leave a space 41 between the inner end of the block and the removable cover 37. Holes 42 are provided through the block 39 to receive bolts for securing the unit to the vehicle chassis.

The block 39 has two bores 43 and 44 respectively which are spaced apart from one another the bores extending parallel to one another and parallel to the end walls 36. The relief valve consists of a movable valve member 45 which is slidable in the bore 43. The outer end of this valve member 45 co-operates with a seating 46 at the inner end of a port 47 in the block 39 which port forms an extension of the bore 43. When, as shown in FIG. 2, the movable valve member 45 is seated it closes the port 47 to a further port 48 in the block 39, this port 48 providing an exhaust port for the discharge of exhaust air from the anti-lock system as later described. The inner end of the movable valve member 45 projects into the interior space 41 of the housing 34 and bears against one end of a beam 49 which extends lengthwise between the bores 43, 44. The opposite end of the beam 49 is connected by a pivot pin 50 to the inner end of a piston 51 which is slidable in the bore 44. At its outer end the bore 44 has an extension of reduced diameter which provides a port 52.

A fulcrum for the beam 49 is provided by a roller 53 carried on one end of a rod 54 which is supported in the opposite end walls 36 of the casing so as to extend in the length-wise direction of the beam 49. One end of this rod extends out of the casing and is connectable through a linkage (not shown) to a wheel axle of the vehicle so that the rod is slidable in the lengthwise direction of the beam as a result of relative movement between the vehicle platform and wheel axle due to variations in vehicle loading, such movement of the rod adjusting the fulcrum point of the beam in accordance with such loading. Movement of the rod to the right in FIG. 2, is limited by stop means comprising a spring retaining ring 55 which abuts the end wall 36 at the limit of rod movement. A further spring retaining ring 56 limits movement in the opposite direction.

The unit shown in FIG. 2 of the drawings is installed in a vehicle with the beam 49 extending in the fore and aft direction of the vehicle, the unit shown in FIG. 3 of the drawings being installed so that the pendulum 27 is swingable in the fore and aft direction of the vehicle. With the units installed in this manner the port 24 of the valve 16 is connected to the pneumatic circuit of the brake system of the vehicle, the outlet port 25 being connected to the port 52 in the block 39 of the unit shown in FIG. 2. This piston 51 is thus sensitive to the air pressure in the pneumatic circuit of the brake system. The port 47 in the block 39 is connected to the air exhaust outlet of the anti-lock system of the vehicle so that the movable valve member 45 is sensitive to the exhaust air pressure. Thus the movement of the movable valve member 45 is dependent upon the pivotal movement of the beam 49 which is controlled jointly by the displacement of the piston 51 which is regulated by the pendulum 27 and the positioning of the beam fulcrum which is adjusted by the vehicle loading.

FIG. 4 of the accompanying drawings shows a complete anti-lock system according to one embodiment of the invention for incorporation in the hydraulic braking system of a vehicle.

The hydraulic braking system of the vehicle is of conventional form, hydraulic liquid being supplied to the wheel cylinders of the brakes from a conventional pedal operated master cylinder (not shown). The anti-lock system includes a valve indicated generally by reference numeral 57 which in interposed in the hydraulic lines 58, 59 to the wheel cylinders (not shown) of the brakes of the vehicle rear wheels also not shown, the operation of the valve being controlled by a servo-motor indicated generally by reference numeral 60, operated by compressed air from a source of supply of compressed air (not shown). A control valve indicated generally by reference numeral 61 is interposed between the source of supply of compressed air and the servo-motor the control valve 61 being operable to interrupt the supply of compressed air to the servo-motor and open the working chamber thereof to exhaust. The actuation of the control valve is controlled by an inertia type sensing device shown generally at 62 which is driven from the transmission shaft of the vehicle, the inertia device including an electric switch which is operable by the sensing device to complete the circuit of a solenoid incorporated in the control valve 61, the energisation of the solenoid resulting in the actuation of the control valve to interrupt the supply of compressed air to the servo-motor and open the working chamber thereof to exhaust. The exhaust control valve is incorporated in a unit shown generally at 63 with an inertia device such as a pendulum which is displaceable by vehicle deceleration and a lever mechanism which is operable by variations in vehicle loading. The lever mechanism and pendulum are interconnected by a spring or springs the pendulum being operatively associated with a spring or springs urging the exhaust valve to the closed position. The springs, lever mechanism and pendulum are arranged so that as the vehicle loading increases the force of the spring or springs between the lever mechanism and pendulum decreases so that the force exerted on the spring or springs acting on the exhaust valve increases with pendulum displacement as a result of vehicle deceleration whereby the pressure in the exhaust line is increased.

The system and component parts thereof of the present embodiment will now be described in greater detail. The servo-motor 60 is of the diaphragm type the working chamber 64 on one side of the diaphragm 65 having a port 66 for connection to the source of compressed air through a pipe line 67b. On the side of the diaphragm 65 opposite to the working chamber 64 a plunger 67c extends outwardly from the diaphragm the plunger being connected by its inner end to the diaphragm so as to be movable therewith. The plunger 67c extends into the bore 68 of a tubular body 69 attached to the servo-motor casing the outer end of the plunger having a spigot 70 which co-operates with a ball valve 71 in the bore the ball forming the movable member of the valve 57. The tubular body 69 has an inlet 72 for connection to the outlet of a pedal operated master cylinder (not shown) and outlets 73 for connection to the pipe lines 58, 59 of the hydraulic circuit to the wheel cylinders of the rear brakes of the vehicle. The ball valve 71 is arranged between the said outlets 73 and inlet 72 and when seated on the valve seating 74 isolates one from the other the ball valve 71 being held unseated by the plunger 67c displaced by pressure in the working chamber 64 of the servo-motor acting on the diaphragm, reduction of this pressure permitting the diaphragm 65 to move in a direction to permit the ball valve 71 to move towards its seating 74.

The control valve 61 is interposed in the pipe-line 67 between the servo-motor and the source of compressed air. The control valve comprises a valve body 75 having an outlet 76 for connection by pipe line 67b to the inlet 66 of the servo-motor, an inlet 77 for connection to source of compressed air by pipe line 67a and a main exhaust port 78. Disposed within the valve body 75 is a spool 79 which is supported at each end by flexible diaphragms 80, 81 repectively. The spool has two annular closure members 82, 83 respectively spaced apart from one another lengthwise of the spool. The closure member 82 is on the inner side of the diaphragm 80 the closure member 83 being on the inner side of diaphragm 81. The closure member 82 co-operates with a first seating 84 in the valve body 75 through which the compressed air flows from the valve inlet 77 to the valve outlet 76 the outer closure member 83 co-operating with a second seating 85 also in the valve body 75 through which the compressed air flows from the outlet side 76 of the valve to the exhaust port 78. Passages 86 and 87 in the valve body 75 connect the inlet side 77 of the control valve to one side of the side of the diaphragm 81 at the end of the spool adjacent the second seating so that compressed air entering the valve acts on both diaphragms 80, 81 to urge the spool 79 in a direction in which the first seating 84 is open so that the compressed air can flow through the valve to the servo-motor the second seating 85 being closed to shut off the main exhaust 78. The valve body 75 has a secondary exhaust port 88 for the release of compressed air from the passages 86, 87 in the valve body 75 such release resulting in displacement of the spool in a direction to close the first seating 84 and interrupt the flow of compressed air to the working chamber 64 of the servo-motor 60 and open the second seating 85 to connect the working chamber of the servo-motor to the main exhaust 78. The opening of the passages 86, 87 in the valve body 75 to the secondary exhaust 88 is controlled by a closure member 89 co-operating with a seating 90 in the valve body. The closure member is carried by the plunger 91 of a solenoid 92 in the valve body 75 the closure member being seated when the solenoid is de-energised. Energisation of the solenoid 92 to unseat the closure member 89 is effected upon closure of normally open electric switch contacts of a micro-switch 93 this switch being connected by conductor 94 to the solenoid coil. The micro-switch 93 is incorporated in the inertia sensing device 62 the switch operation being controlled by the said device 62. The sensing device 62 is of the conventional type using a flywheel 95 as the inertia member the flywheel being capable of overrunning when a wheel or wheels tend to lock, overrunning of the flywheel being utilised to actuate a cam mechanism the operation of which results in closure of the switch contacts of the micro-switch through a push rod 96 to complete the circuit to the solenoid. The construction and operation of such devices is well known and accordingly no further description thereof willl be given.

When the solenoid is energised the control valve 61 is, as described above, operated to interrupt the supply of compressed air to the working chamber 64 of the servo-motor 60 and open the same to the main exhaust 78.

The exhaust of compressed air is regulated by an exhaust valve indicated generally by reference numeral 97 which has a valve closure member which is spring loaded so as to be urged to the closed position the spring loading being variable by a combination of vehicle loading and vehicle decleration. The exhaust valve is contained in the unit 63 which comprises a casing 98 which is adapted to be mounted on for example the vehicle chassis or other part movable relative to the vehicle rear axle upon variation of vehicle loading. The exhaust valve 97 comprises a valve body 99 which is formed integral with casing 98. The valve body has an inlet 100 and outlets 101 which when the valve is closed are isolated from one another by the valve closure member 102 co-operating with a seating 103 at the inner end of the inlet 100. The closure member is urged onto its seating by coil spring 104 one end of which bears against one side of the closure member the other end of the spring bearing against a spring cup 105. The valve inlet is connected by pipe line 106 to the main exhaust port 78 of the control valve 61. The casing 98 encloses an inertia device in the form of a pendulum 107 which is pivotally mounted on a pivot pin 108 so as to be swingable in the fore and aft direction of the vehicle. The pendulum has an arm 109 which extends radially in relation to the pivotal axis of the pendulum of the radially outer end of the arm having an adjustable tappet screw 110 which bears against spring cup 105 supporting the coil spring 104. A stop 111 is provided in the casing 98 to limit swinging movement of the pendulum 107 in the clockwise direction (FIG. 4). Also mounted in the casing is an arm 112 which is fixed about one end to a stub shaft 113 offset to the pivot pin 108 carrying the pendulum 107 and arranged so that the arm can turn with the shaft in the fore and aft direction of the vehicle. This stub shaft 113 is rotatably supported in bearings in the casing 98 one end of the stub shaft extending outwardly of the casing the outwardly projecting end having secured thereto one end of a lever 114 the opposite end of which is connectable by a suitable linkage 115 to the rear axle of his vehicle. The radially outer end of the arm 112 in the casing is connected to one end of a coil spring 116 the opposite end of which is connected to the anchor pin 117 on the pendulum 107. The arrangement is such that with the vehicle in an unladen condition the lever 114 connected to the vehicle rear axle assumes a position which holds the arm 112 in a position of rest to apply through the coil spring 116 a pull on the pendulum 107 which urges the same to its aft limit position so that the pendulum applies a minimum compression on the the coil spring 104 acting on the exhaust valve closure member 102. As vehicle loading increases the resulting downward displacement of the vehicle chassis relative to the rear axle effects a turning movement of the lever 114. This movement of the lever 114 in turn, causes turning movement of the arm 112 in a direction to reduce the pull of the spring 116 on the pendulum. With this arrangement the displacement of the pendulum 107 will vary in accordance with vehicle loading and vehicle deceleration so that the pressure in the exhaust line 106 will vary accordingly.

The anti-lock system above described can be used in a pneumatic braking system on a vehicle. For this purpose the servo-motor 60 is dispensed with the outlet from the control valve 61 being connected directly to the wheel cylinders of the brakes to be controlled. Such a system is shown in FIG. 5 of the drawings. The control valve 61, inertia sensing unit 62 and unit 63 are included in the system and are all identical in construction and operation as described in connection with the embodiment of FIG. 4. The outlet 76 of the control valve 61 is however connected directly by pipe line 67 to pipe lines 118, 119 supplying compressed air to the pneumatic wheel cylinders of the rear wheel brakes of the vehicle.

What is claimed is:

1. In an anti-lock system in a fluid pressure-operated braking system of a vehicle in which means are provided for controlling the exhaust of pressure fluid from the anti-lock system and in which a relief valve is disposed in an exhaust line of the anti-lock system and is actuated by deceleration of the vehicle in combination with other means actuated by vehicle loading for regulating the actuation of the relief valve to permit the exhaust of the pressure fluid from the system, the improvement of a relief valve with a normally closed movable valve member positioned for unseating by the pressure of fluid in the exhaust line of the system, and means actuated by vehicle deceleration and means actuated by vehicle loading applying a load to the movable valve member positioned to oppose the force of the exhaust pressure fluid acting to unseat said movable valve member.

2. The anti-lock system of claim 1 wherein said means actuated by vehicle deceleration comprises an inertia mass mountable on the vehicle for swinging in the fore and aft direction of the vehicle and said means actuated by vehicle loading includes a linkage for interposing between the vehicle chassis and a relatively movable part of the vehicle, said inertia mass and linkage being interconnected with one another so actuation of said linkage by a change in loading of the vehicle combined with movement of the inertia mass from a position of rest resulting from deceleration of the vehicle, applies a load to said movable member in opposition to the load applied to said movable valve member by the pressure fluid in the exhaust line of the anti-lock system.

3. The anti-lock system of claim 2 wherein said movable valve member is provided with spring means urging said member to a seated position, said inertia mass being operatively connected to said relief valve so that the movement of the inertia mass from the position of rest increases the spring force acting on said movable valve member.

4. The anti-lock system of claim 3 wherein said relief valve, inertia mass and linkage are combined into a single co-acting unit.

5. The anti-lock system of claim 4 wherein said means actuated by vehicle deceleration is an inertia mass and includes a beam pivotally mounted along its length with the pivotal point of the beam being variable lengthwise of the beam means actuated by variations in vehicle loading.

6. The anti-lock system of claim 5 including a control valve for connection between a source of compressed air and servo-motor means in the vehicle braking system operable directly by said compressed air and operatively connected to the servo-motor means in the vehicle braking system, a sensing device of the inertia type for sensing vehicle wheel speed operatively connected to the control valve to cause actuation of said control valve to interrupt the flow of compressed air from the source of supply to the servo-motor means operated thereby and divert the compressed air to exhaust upon any tendency of a wheel to lock to relieve the brake pressure, the exhaust of compressed air being controlled by said relief valve.

7. The anti-lock system of claim 6 wherein said control valve includes a movable valve member with a diaphragm and closure member, which valve is disposed for urging to a first position to close the exhaust outlet of the valve by the compressed air acting on said diaphragm operatively connected to said movable valve member, with the release of the compressed air from one side of the diaphragm permitting said movable valve member to move to a second position to interrupt the flow of compressed air from the source of supply and open the exhaust outlet, the release of the compressed air resulting from unseating said closure member operatively connected thereto, the actuation of the closure member being controlled by said inertia type sensing device.

8. The anti-lock system of claim 7 wherein closure member is provided with electrically controlled means operatively connected thereto.

9. The anti-lock system of claim 8 wherein the closure member is carried by the plunger of a solenoid, the electric circuit of which is controlled by an electrical switch operatively connected to such inertia type sensing device.

10. The anti-lock system of claim 6 including a servo-motor, said control valve being connected between the source of supply of compressed air and the working chamber of said servo-motor, said servo-motor controlling operation of a valve in a hydraulically operated braking system of a vehicle, the arrangement being such that under normal conditions compressed air supplied to the working chamber of the servo-motor maintains the servo-motor operated valve open to permit the supply of hydraulic liquid to lines communicating with the vehicle brakes, interruption of the supply of compressed air permitting the servo-motor to operate to permit the servo-motor operated valve to close, such closure being regulated by the relief valve of the system.

11. The anti-lock system of claim 3 including a control valve connected between a source of compressed air and servo-motor means in direct communication with the vehicle brakes.

12. A relief valve device to control the fluid pressure system that controls the fluid pressure acting in the brake lines of a fluid pressure vehicle braking system, said valve comprising a valve member, resilient means normally maintaining said valve member seated, a pivotted weight member normally bearing against said resilient means to increase the loading of said resilient means maintaining said valve member seated and swingable in the fore and aft direction of a vehicle to which said valve is connected, arm means having a pivotted stub shaft on one end thereof adjacent said weighted member, lever means having one end connected to said stub shaft to turn said arm means, spring resilient means having one end connected to said weight member, its other end connected to the end of said arm means opposite said stub shaft, and linkage means connected to the other end of said lever means and adapted to be connected to the rear axle of a vehicle, said lever means being connected to said linkage means and to said arm means to decrease the pull of said spring resilient means on said weight member solely in response to deceleration of the vehicle to which the device is connected.

References Cited

UNITED STATES PATENTS

| 1,926,296 | 9/1933 | Merchie | 303—21 X |
| 2,181,161 | 11/1939 | Wolf | 303—24 X |
| 2,934,381 | 4/1960 | Hill | 303—24 |
| 3,008,771 | 11/1961 | Moyer | 303—24 |
| 3,297,368 | 1/1967 | Cumming | 303—24 |

MILTON BUCHLER, Primary Examiner

J. J. McLAUGHLIN, Jr., Assistant Examiner

U.S. Cl. X.R.

137—45; 303—22, 24

UNITED STATES PATENT OFFICE
CERTIFICATE OF CORRECTION

Patent No. 3,527,504          Dated Sept. 8, 1970

Inventor(s) Leslie C. Chouings et al.

It is certified that error appears in the above-identified patent and that said Letters Patent are hereby corrected as shown below:

In the heading to the printed specification, line 11, "6,442/67" should read -- 6,422/67 --.

Signed and sealed this 11th day of April 1972.

(SEAL)
Attest:

EDWARD M. FLETCHER, JR.                ROBERT GOTTSCHALK
Attesting Officer                      Commissioner of Patents

FORM PO-1050 (10-69)